United States Patent
Duarte et al.

(10) Patent No.: US 7,733,331 B2
(45) Date of Patent: Jun. 8, 2010

(54) SUPPORT AND ADJUSTMENT APPARATUS FOR A DATA PROCESSING DEVICE DISPLAY

(75) Inventors: Matias G. Duarte, Los Angeles, CA (US); Matthew J. Hershenson, Palo Alto, CA (US)

(73) Assignee: Microsoft Corporaiton, Redmond, WA (US)

( * ) Notice: Subject to any disclaimer, the term of this patent is extended or adjusted under 35 U.S.C. 154(b) by 1069 days.

(21) Appl. No.: 11/325,090

(22) Filed: Jan. 3, 2006

(65) Prior Publication Data

US 2006/0209033 A1 Sep. 21, 2006

Related U.S. Application Data

(60) Provisional application No. 60/641,319, filed on Jan. 3, 2005.

(51) Int. Cl.
*G09G 5/00* (2006.01)

(52) U.S. Cl. .................................. 345/169; 361/679.39

(58) Field of Classification Search ................. 345/205, 345/905, 169; 312/223.2; 361/600, 610, 361/679.02, 679.09, 679.35, 679.39, 679.56, 361/679.58
See application file for complete search history.

(56) References Cited

U.S. PATENT DOCUMENTS

| | | | |
|---|---|---|---|
| 5,497,296 A | 3/1996 | Satou et al. | |
| 5,548,478 A * | 8/1996 | Kumar et al. | 361/679.27 |
| 5,668,570 A | 9/1997 | Ditzik | |
| 6,636,419 B2 | 10/2003 | Duarte et al. | |
| 6,850,226 B2 * | 2/2005 | Finke-Anlauff | 345/169 |
| 6,900,981 B2 * | 5/2005 | Kuivas et al. | 361/679.06 |
| 2004/0108968 A1 | 6/2004 | Finke-Anlauff | |
| 2004/0164965 A1 | 8/2004 | Bullister | |

* cited by examiner

*Primary Examiner*—Kevin M Nguyen
*Assistant Examiner*—Kenneth B Lee, Jr.

(57) ABSTRACT

An apparatus is described comprising: a data processing device comprising a base with a plurality of input elements configured thereon, and an adjustable display having a display screen for displaying text and graphics, the display cooperatively engaged with the base to move from between a first position, in which none, or only a subset of the input elements are accessible, to a second position, in which all of the input elements are accessible; and a first support arm having a first end and a second end, the first support arm pivotally coupled to the base at the first end at a pivot point, and engaged with a first track on the display at the second end, wherein during movement of the display from the first position to the second position, the first support arm pivots around the pivot point at the first end and runs along the first track at the second end, thereby guiding and supporting the display during the movement.

20 Claims, 7 Drawing Sheets

SUPPORT AND ADJUSTMENT APPARATUS FOR A DATA PROCESSING DEVICE DISPLAY

RELATED APPLICATION

This application claims priority from the provisional application entitled SUPPORT AND ADJUSTMENT APPARATUS FOR A DATA PROCESSING DEVICE DISPLAY, Ser. No. 60/641,319 filed, Jan. 3, 2005.

TECHNICAL FIELD

This application relates generally to the field of data processing devices, and more particularly, to a support and adjustment apparatus for a data processing device display.

BACKGROUND

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To deal with this problem, the assignee of the present application developed a data processing device which adjusts from a first position, in which a first set of input elements are exposed, to a second position, in which a full-sized alphanumeric keyboard is exposed. One embodiment of this data processing device 100 which includes an adjustable display 102 is illustrated in FIGS. 1a-b (which correspond to FIGS. 1a and 1, respectively, in Duarte, U.S. Pat. No. 6,636,419, also assigned to the assignee of the present application). FIG. 1a shows the adjustable display 102 in the second position in which a full-sized alphanumeric keyboard 104 is exposed and FIG. 1b shows the adjustable display 102 in the first position in which a limited number of the keys are exposed. Thus, the user may enter data and perform control functions in both the first and second display positions.

The sides of the data processing device 100 include tracks 110 that guide the display 102 between the first and second positions. The display 102 includes a complimentary pins or other engagement elements 114 to engage the tracks 110. Latches may also be included in the tracks 110 and/or in the track engagements 114 so that the display is latched in the open and/or closed position.

SUMMARY

An apparatus is described comprising: a data processing device comprising a base with a plurality of input elements configured thereon, and an adjustable display having a display screen for displaying text and graphics, the display cooperatively engaged with the base to move from between a first position, in which none, or only a subset of the input elements are accessible, to a second position, in which all of the input elements are accessible; and a first support arm having a first end and a second end, the first support arm pivotally coupled to the base at the first end at a pivot point, and engaged with a first track on the display at the second end, wherein during movement of the display from the first position to the second position, the first support arm pivots around the pivot point at the first end and runs along the first track at the second end, thereby guiding and supporting the display during the movement.

BRIEF DESCRIPTION OF THE DRAWINGS

A better understanding of the support and adjustment apparatus for a data processing display device can be obtained from the following detailed description in conjunction with the following drawings, in which.

DETAILED DESCRIPTION

In the following description, for the purposes of explanation, numerous specific details are set forth in order to provide a thorough understanding of the support and adjustment apparatus for a data processing display device. It will be apparent, however, to one skilled in the art that the techniques may be practiced without some of these specific details. In other instances, well-known structures and devices are shown in block diagram form to avoid obscuring the underlying principles of the present invention.

Figure 1A:
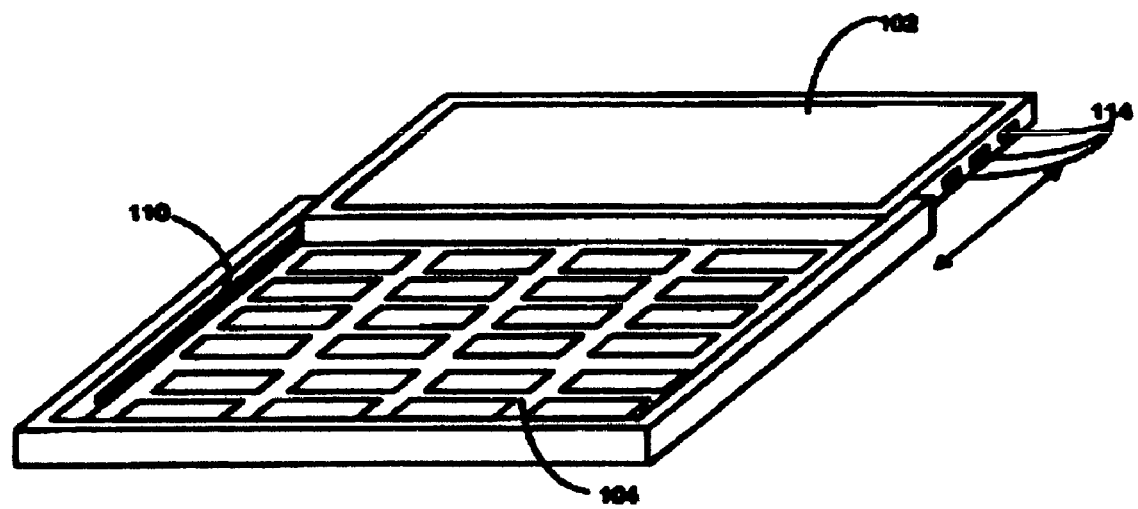
FIGS. 1a-c illustrate a prior art data processing device with an adjustable display.
Figure 1B:
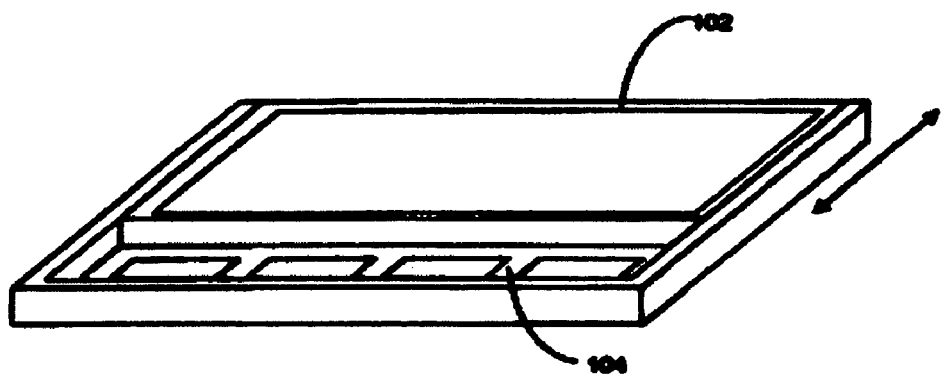
Figure 1C:
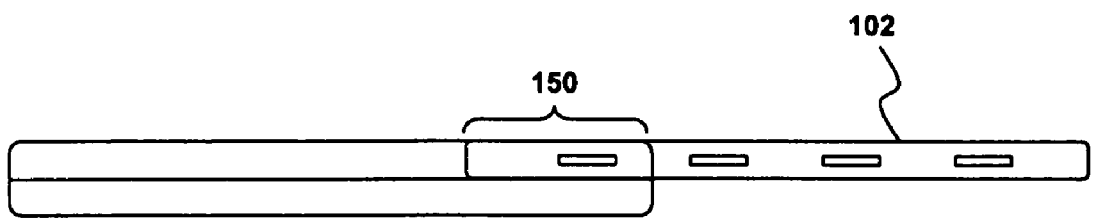

One problem associated with the type of adjustable display mechanism illustrated in FIGS. 1a-c is the travel distance of the display is limited because the display must be adequately supported by the body of the data processing device. As illustrated generally in FIG. 1c, even when the display is in the second or "open" position, the bottom surface of the display must overlap with the top surface of the body by a certain distance 150 to provide support for the display, thereby obscuring significant portions of the top surface of the body (i.e., portions where additional keys might be placed).

Figure 2:
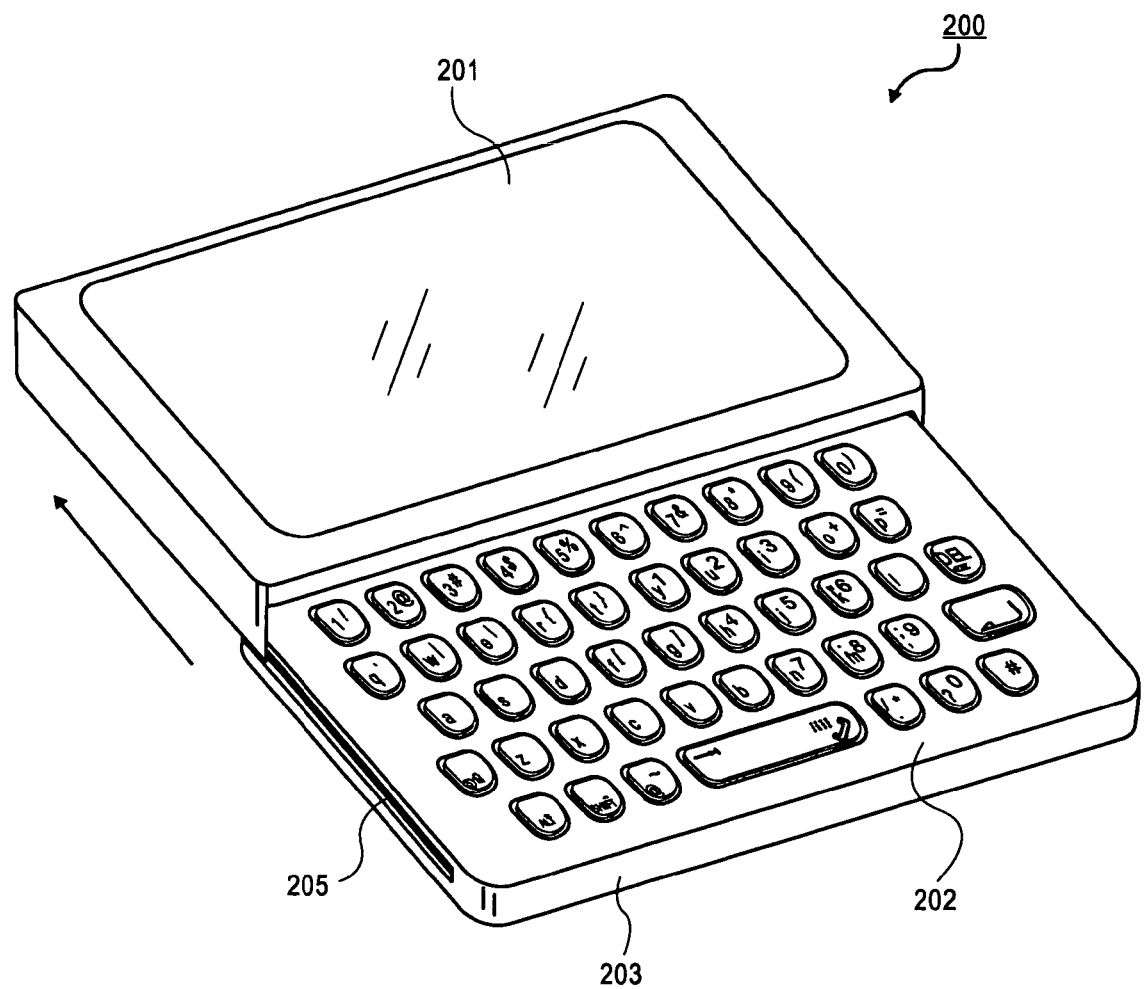
FIG. 2 illustrates a front perspective view of a data processing device on which embodiments of the invention are employed.

FIG. 2 illustrates one embodiment of the invention which solves the foregoing problems. Like the embodiments described above, the data processing device 200 of this embodiment includes a display 201 moveably coupled to a data processing device body 203. Unlike prior embodiments, however, the display of this embodiment is capable of moving a significantly greater distance, thereby exposing more of the front surface of the body 203 when in an "open" position. The body includes a keyboard 202 with a plurality of alphanumeric keys and/or other types of input elements through which the user may enter data and/or perform control functions on the data processing device 200. Although an alphanumeric keyboard is illustrated in FIG. 2, the underlying principles of the invention are not limited to any particular type of keyboard.

In one embodiment, the display 201 includes rails 206 on each of its sides which engage with corresponding tracks 205 on each of the sides of the data processing device body 203 to guide the display from a first or "closed" position to a second or "open" position (which is illustrated in FIG. 2). However, various different mechanisms may be employed to guide the display between the two (or more) positions while still complying with the underlying principles of the invention.

FIGS. 3a-d illustrate the underside of the data processing device as the display 201 is moved from the first or "closed" position to the second or "open" position. Two deployable support arms 301 and 302 couple the display 201 to the body 203 and provide support for the display 201 as it moves from the first position to the second position. The support arms 301 and 302 are pivotally coupled to the body 203 at pivot points 331 and 332, respectively. In one embodiment, the support arms 301, 302 include pins which engage with holes formed on the body 203 at the pivot points. However, various alternate techniques may be employed to pivotally couple the arms to the body.

In one embodiment, the arms 301 and 302 also include pins 305 and 306 which engage with tracks 307 and 308, respectively, on the under surface of the display, as shown. As the display is moved from the first or "closed" position (FIG. 3a) to the second or "open" position (FIG. 3b), the pins 305 and 306 are guided through the tracks 307, 308 from a first position (i.e., towards the sides of the display) to a second position (i.e., towards the center of the display). In one embodiment, the pins 305, 306 include heads (not shown) to secure the support arms in place within the tracks 307, 308. That is, the pins 305, 306 extend through the tracks 307, 308 into small chambers formed in the display beneath the tracks and the pin heads, which are larger in size than the width of the tracks, reside within the chambers, thereby securing the support arms to the tracks.

In addition, in one embodiment, springs 303 and 304 are positioned within the chambers in the display 201 to apply a force directing the display to the second or "open" position. Specifically, the springs 303, 304 are coupled to respective ends of each of the arms 301, 302 (i.e., the ends with pins 305, 306). The other ends of the springs 303, 304 are anchored to an internal surface within the display 201, thereby generating a force on the end of each of the arms 301, 302 towards the center of the display.

Figure 4:
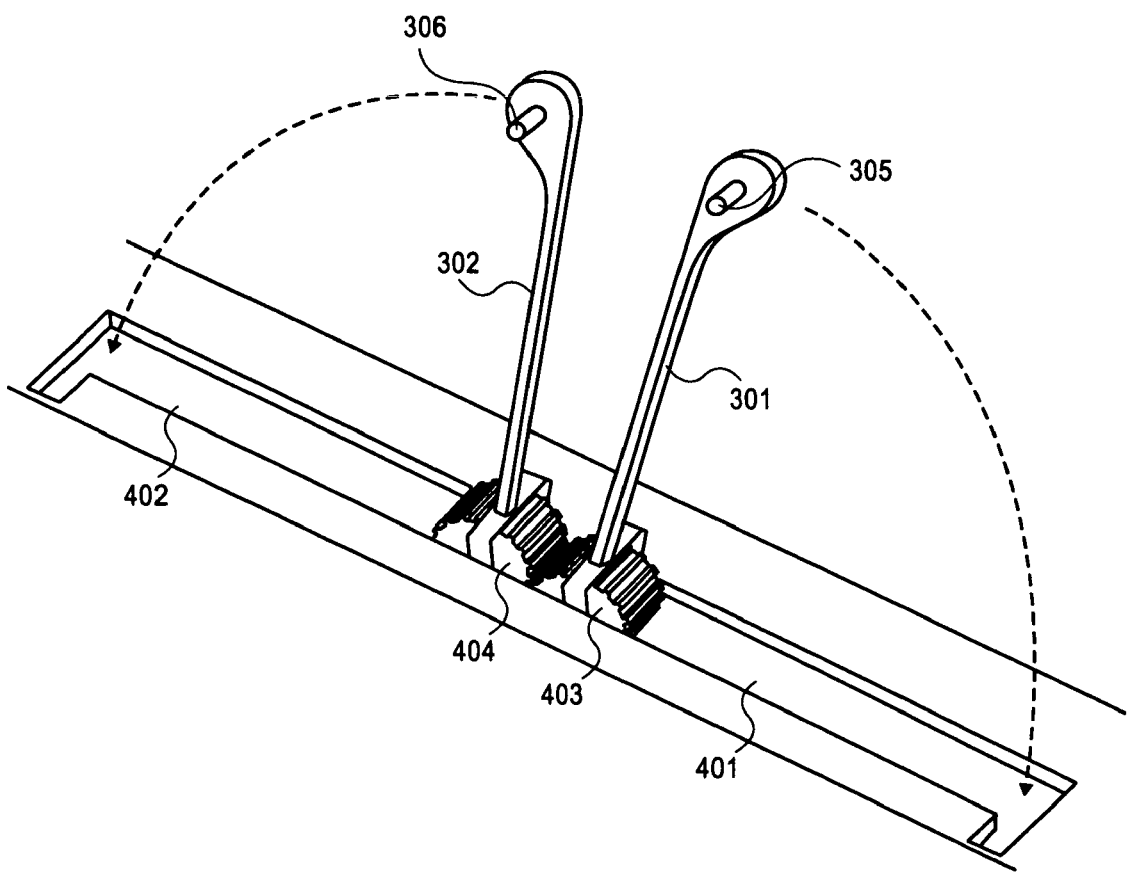
FIG. 4 illustrates dual support arms employed in one embodiment of the invention.

FIG. 4 illustrates one embodiment of the support arms and the manner in which the support arms are retracted within the data processing device body 203. In this embodiment, the support arms 301 and 302 include dual meshed gears 403 and 404, respectively, surrounding each of the points at which the arms pivot in relation to the body 203. The meshed gears are cooperatively engaged to ensure that the support arms 301 and 302 move from the first position to the second position at substantially the same rate. In addition, as illustrated in FIG. 4, two elongated open volumes 401 and 402 are formed on the surface of the body to accommodate the support arms 301 and 302, respectively, when they are retracted to the "closed" position (i.e., when the display covers the keyboard 202). In one embodiment, the gears 403 and 404 are positioned completely within the volumes 401 and 402, respectively (i.e., so they do not break the plane defined by the back surface of the body as they are shown in FIG. 4).

Figure 3A:
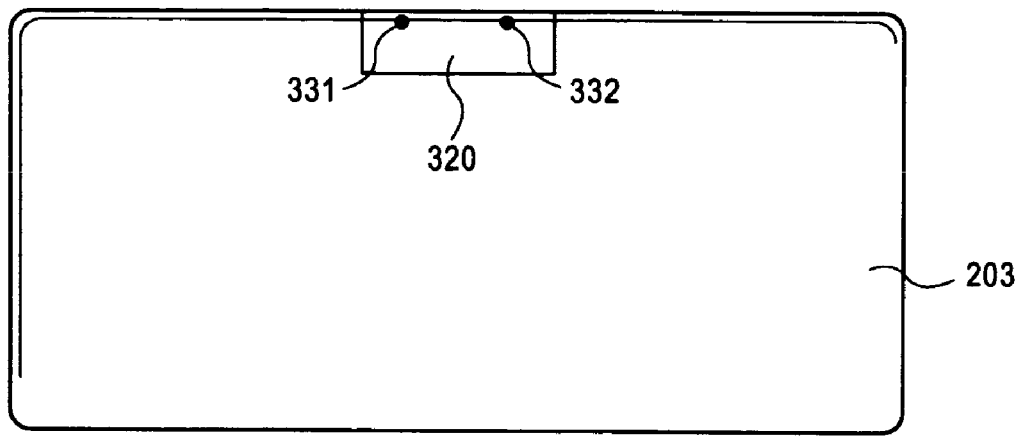
FIGS. 3a-d illustrate a bottom view of a data processing device employing one embodiment of the invention.

In operation, when the display is in the first or "closed" position, as illustrated in FIG. 3a, the support arms 301, 302 are stowed within the two volumes 401, 402 and are substantially parallel to the length of the body 203 and display 201. In this position, the force applied by the springs 303, 304 is substantially parallel to the length of the display and the support arms. As such, no force is applied to move the display to the "open" position. In addition, in this position, a latching mechanism may be used to secure the display in the "closed" position.

Figure 3B:
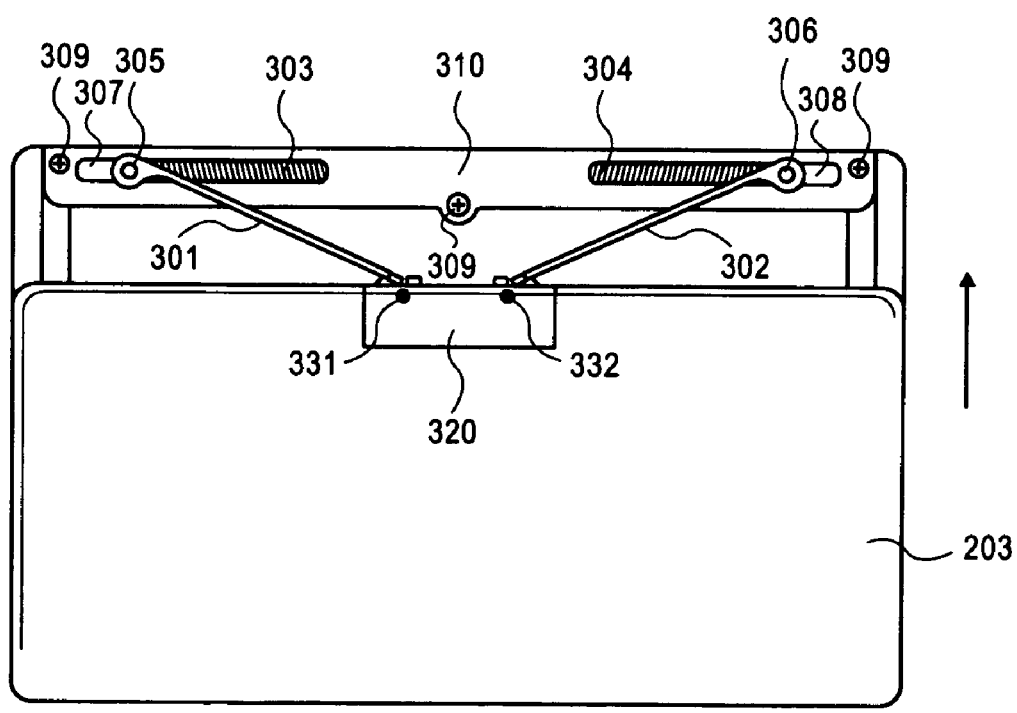
Figure 3C:
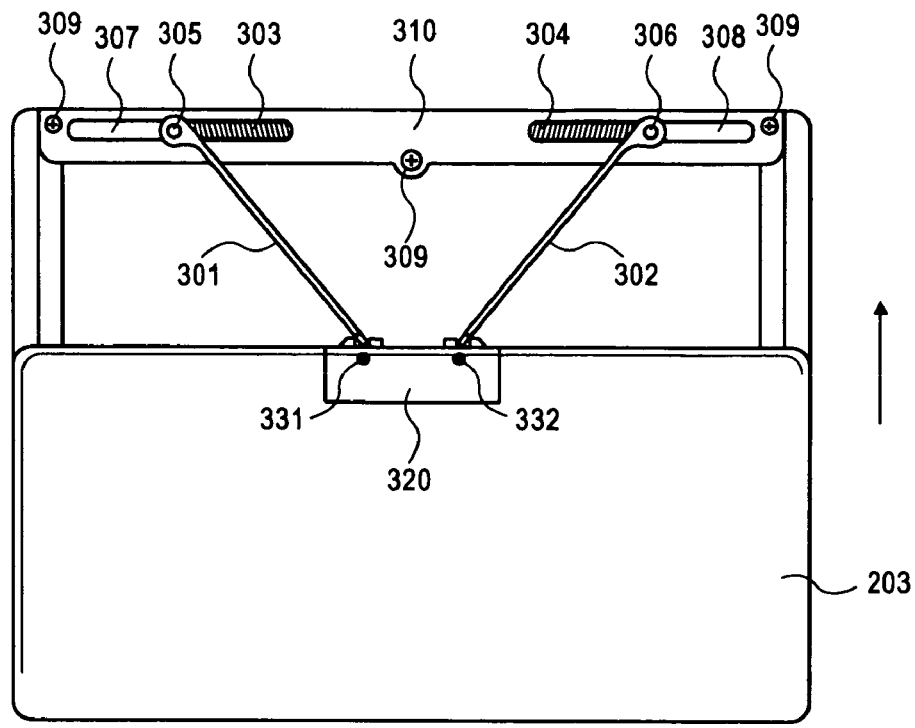
Figure 3D:
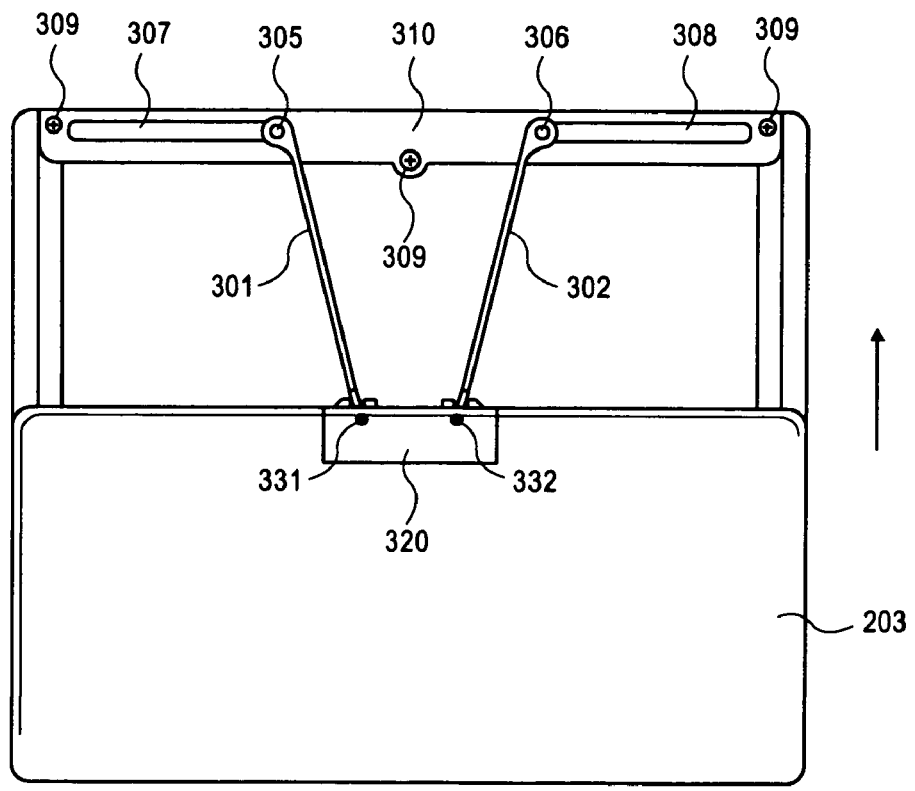

A force applied by the user directing the display towards the "open" position unlatches the display and causes the display to move as shown in FIGS. 3b-d. In these positions, the force applied by the springs is no longer parallel to the length of the support arms. As such, the display is automatically forced to the "open" position shown in FIG. 3d.

Figure 5A:
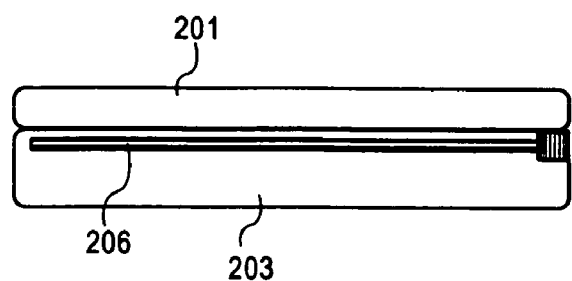
FIG. 5 illustrates a side view of a data processing device employing one embodiment of the invention.
Figure 5B:
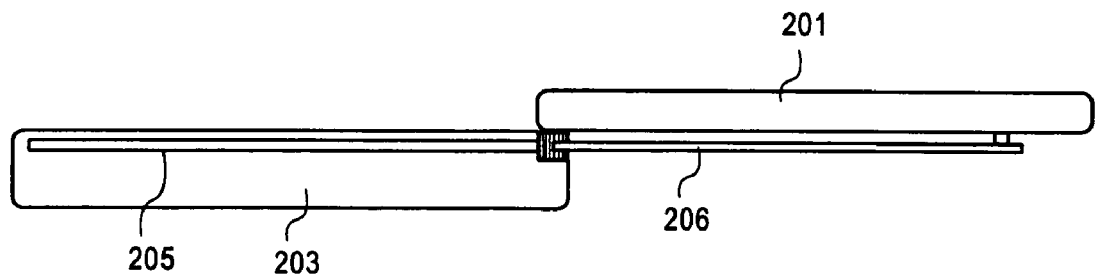

FIGS. 5a-b illustrate the data processing device from a side view. In FIG. 5a the display 201 is in the "closed" position and in FIG. 5b the display is in the "open" position. Several beneficial features of the embodiments of the invention described herein can be seen from this perspective. Because the display is supported by the support arms 301, 302 (and not merely the base 203) the distance traveled by the display 201 is significantly greater than in prior adjustable display configurations. As such, additional keys or other input elements may be placed on the top surface of the body 203. Moreover, a relatively small volume 401, 402 is required to stow the support arms 301, 302 when the display is in a "closed" position, thereby leaving more space for other functional components within the body 203 (e.g., additional circuitry).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ dual support arms for supporting the display, a single arm may be used under certain conditions. Moreover, although the support arms described above are pivotally coupled to the base and run through a track on the display, alternate embodiments may employ support arms which are pivotally coupled to the display and run through tracks on the base. Accordingly, the scope and spirit of the invention should be judged in terms of the claims which follow.

What is claimed is:

1. An apparatus comprising:
a data processing device comprising a base with a plurality of input elements configured thereon, and a movable display housing having a display screen, the display housing configured to move between a first position that covers the input elements and a second position in which the input elements are accessible; and
first and second support arms configured to support the display housing for movement between the first and second positions, the first and second support arms each having a pivot attachment that pivotally couples to the base, the first and second support arms each further having a track attachment that engages a track in the display housing beneath the display screen, wherein a first distance between the first and second support arms pivot attachments to the base remains constant when the display housing is moved between the first and second positions, and wherein a second distance between the first and second support arms track attachments increases when the display housing is moved to the first position that covers the input elements and decreases when the display housing is moved to the second position in which the input elements are accessible.

2. The apparatus as in claim 1 wherein the input elements comprise a plurality of alphanumeric keys.

3. The apparatus as in claim 1 wherein the base comprises display tracks for interfacing with corresponding rails on the display housing to guide the display housing between the first position and the second position.

4. The apparatus as in claim 1 wherein the pivot attachments for the first and second support arms are located on the base and concealed by the display housing.

5. The apparatus as in claim 1 further comprising a first spring configured to apply a force to the track attachment of the first support arm and a second spring configured to apply a force to the track attachment of the second support arm, the first and second springs further configured to assist when the display housing is moved from the second position to the first position that covers the input elements.

6. The apparatus as in claim 5 further comprising first and second chambers formed within the display housing, the first and second springs held within the respective first and second chambers, wherein the track attachment of the first support arm includes a first pin that engages the first spring in the first chamber, and wherein the track attachment of the second support arm includes a second pin that engages the second spring in the second chamber.

7. The apparatus as in claim 1 further comprising a latch configured to hold the display housing in place when the display housing is in the first position that covers the input elements.

8. The apparatus as in claim 1 wherein a surface of the display screen and a surface of the base containing the plurality of input elements are substantially parallel.

9. The apparatus as in claim 8 wherein the surface of the base containing the plurality of input elements and the surface of the display screen remain substantially parallel during movement of the display housing from the first position to the second position.

10. The apparatus as in claim 1 further comprising a first gear at the pivot attachment of the first support arm and a second gear at the pivot attachment of the second support arm, the first and second gears cooperatively engaged to move the first and second support arms from the first position to the second position at substantially a same rate.

11. An apparatus comprising:
a base of the apparatus configured with input keys;
a display housing configured to move relative to the base between a first position in which the display housing covers the input keys and a second position in which the input keys are accessible;
first and second support arms configured to support the display housing for movement between the first and second positions, the first and second support arms each pivotally coupled to the base and engaged in a track in the display housing, wherein:
a first distance remains constant between the first and second support arms where pivotally coupled to the base; and
a second distance increases between the first and second support arms where engaged in the track when the display housing is moved to the first position that covers the input keys, and the second distance decreases between the first and second support arms where engaged in the track when the display housing is moved to the second position in which the input keys are accessible.

12. The apparatus as in claim 11 wherein the input keys comprise a plurality of alphanumeric keys.

13. The apparatus as in claim 11 wherein the base of the apparatus comprises display tracks for interfacing with corresponding rails on the display housing to guide the display housing between the first position and the second position.

14. The apparatus as in claim 11 wherein the first and second support arms each include a pivot attachment that pivotally couples to the base and is concealed by the display housing.

15. The apparatus as in claim 11 wherein the first and second support arms each include a track attachment that engages the track in the display housing, the apparatus further comprising a first spring configured to apply a force to the track attachment of the first support arm and a second spring configured to apply a force to the track attachment of the second support arm, the first and second springs further configured to assist when the display housing is moved from the second position to the first position that covers the input keys.

16. The apparatus as in claim 15 wherein the track includes first and second chambers formed within the display housing, the first and second springs held within the respective first and second chambers, wherein the track attachment of the first support arm includes a first pin that engages the first spring in the first chamber, and wherein the track attachment of the second support arm includes a second pin that engages the second spring in the second chamber.

17. The apparatus as in claim 11 further comprising a latch configured to hold the display housing in place when the display housing is in the first position that covers the input keys.

18. The apparatus as in claim 11 wherein a surface of the display housing and a surface of the base that includes the input keys are substantially parallel.

19. The apparatus as in claim 18 wherein the surface of the base and the surface of the display housing remain substantially parallel during movement of the display housing from the first position to the second position.

20. The apparatus as in claim 14 further comprising a first gear at the pivot attachment of the first support arm and a second gear at the pivot attachment of the second support arm, the first and second gears cooperatively engaged to move the first and second support arms from the first position to the second position at substantially a same rate.

* * * * *